US008473411B2

(12) United States Patent
Baumgartner, IV et al.

(10) Patent No.: US 8,473,411 B2
(45) Date of Patent: Jun. 25, 2013

(54) BULK ACTIVATION OF PORTABLE CONSUMER PAYMENT DEVICES (75) Inventors: David Ross Baumgartner, IV, Parker, CO (US); Keith Robert Larsen, Mequon, WI (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/129,536

(22) Filed: May 29, 2008

(65) Prior Publication Data

US 2008/0301001 A1 Dec. 4, 2008

Related U.S. Application Data (60) Provisional application No. 60/940,911, filed on May 30, 2007.

(51) Int. Cl.
*G06Q 40/00* (2012.01)
(52) U.S. Cl.
USPC ............................................... 705/39; 705/41
(58) Field of Classification Search
USPC .................................................... 705/39, 41
See application file for complete search history.

(56) References Cited

U.S. PATENT DOCUMENTS

| | | | | |
|---|---|---|---|---|
| 6,000,608 | A * | 12/1999 | Dorf | 235/380 |
| 6,901,387 | B2 | 5/2005 | Wells et al. | |
| 7,028,896 | B2 * | 4/2006 | Goldstein et al. | 235/436 |
| 2002/0091572 | A1 * | 7/2002 | Anderson et al. | 705/16 |
| 2002/0147662 | A1 * | 10/2002 | Anderson | 705/26 |
| 2002/0152176 | A1 | 10/2002 | Neofytides et al. | |
| 2006/0006223 | A1 * | 1/2006 | Harris | 235/379 |
| 2006/0184386 | A1 * | 8/2006 | Merritt | 705/1 |
| 2006/0190332 | A1 * | 8/2006 | Grider | 705/14 |
| 2006/0259189 | A1 * | 11/2006 | Perlow et al. | 700/231 |
| 2006/0261154 | A1 * | 11/2006 | Arthur et al. | 235/380 |
| 2009/0283594 | A1 * | 11/2009 | Walton et al. | 235/383 |
| 2011/0131107 | A1 * | 6/2011 | Hurst | 705/26.1 |
| 2011/0196753 | A1 * | 8/2011 | Hodgdon et al. | 705/16 |

FOREIGN PATENT DOCUMENTS

WO WO 2005-114440 A1 12/2005

OTHER PUBLICATIONS simultaneously. (2010). In Merriam-Webster Online Dictionary. Retrieved Jun. 10, 2010, from http://www.merriam-webster.com/dictionary/simultaneously.*
Written Opinion of the International Searching Authority, dated Sep. 29, 2008, for PCT/US2008/065291.
International Preliminary Report on Patentability, dated Dec. 1, 2009, for PCT/US2008/065291.

* cited by examiner

*Primary Examiner* — William Rankins
(74) *Attorney, Agent, or Firm* — Cooley LLP; Walter G. Hanchuk; Nathan W. Poulsen (57) ABSTRACT

Portable Consumer Payment Devices (PCPDs), such as gift cards, can be bulk activated and thereby be made ready to use in a commercial transaction. The bulk activation is provided through a web service giving a user experience that includes an online interactive user interface that receives an order for PCPDs and a request to activate all PCPDs in the order. The respective accounts of the PCPDs in the order are funded upon activation and a fee is assessed for the activations. Thereafter, each activated PCPD can be used in a transaction with a merchant who submits the transaction to an acquirer for processing by a transaction handler who requests an issuer of the account of the PCPD to obtain payment for the transaction from the account corresponding to the PCPD.

17 Claims, 7 Drawing Sheets

BULK ACTIVATION OF PORTABLE CONSUMER PAYMENT DEVICES

RELATED APPLICATIONS

The application claims priority to U.S. Patent Application Ser. No. 60/940,911, filed on May 30, 3007, titled Bulk Activation, which is incorporated herein by reference.

BACKGROUND

The present invention relates generally to the electronically ordering and activating of a Portable Consumer Payment Devices (PCPDs), and more particularly to bulk ordering and activating multiple consumer devices, e.g. simultaneously.

PCPDs, such as gift cards, credit cards, debit cards, or prepaid cards, are used by consumers to conduct transactions on an ever increasing scale. Typically, an individual requests one type of PCPD at a time, activating it upon receipt. However, there are some consumers, such as corporate entities, who request large quantities of PCPDs at a time. These requests may be for corporate credit cards for key employees or even prepaid gift cards to be given as rewards.

Each PCPD ordered in bulk currently must be individually activated. This requires the entity who made the order to either take the time to individually activate the PCPDs, spending considerable time for large orders, or to distribute them to users with individual activation codes, whereby the users must take the initiative to activate the PCPD. Some users will activate their PCPD immediately upon receipt, where as others will not, possibly loosing the device or a required activation code in the delay.

Thus, the demand for some entities to order multiple PCPDs simultaneously has also created the need to develop techniques to allow those entities to activate multiple PCPDs in a convenient, time efficient manner.

SUMMARY

In one implementation, Portable Consumer Payment Devices (PCPDs), such as gift cards, can be bulk activated and thereby be made ready to use in a commercial transaction. The bulk activation is provided through a web service giving a user experience that includes an online interactive user interface that receives an order for PCPDs and a request to simultaneously activate all PCPDs in the order. The respective accounts of the PCPDs in the order are funded upon activation and a fee is assessed for the activations. Thereafter, each activated PCPD can be used in a transaction with a merchant who submits the transaction to an acquirer for processing by a transaction handler who requests the issuer to obtain payment for the transaction from the account corresponding to the consumer portable payment device.

In another implementation, the user bulk activation experience includes user input to simultaneously activate only some of the PCPDs in an order thereof.

In another implementation, the user bulk activation experience includes user input of a delay until a predetermine time and date at which the simultaneous activation is performed for one or more sets of PCPDs in an order thereof.

In yet another implementation, an account holder placing an order for PCPDs is assessed a higher fee for activating an individual PCPD that for pro rata bulk activating all PCPD in the order or in sets thereof.

The foregoing and other advantages of the inventions will appear in the detailed description that follows.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Figure 1:
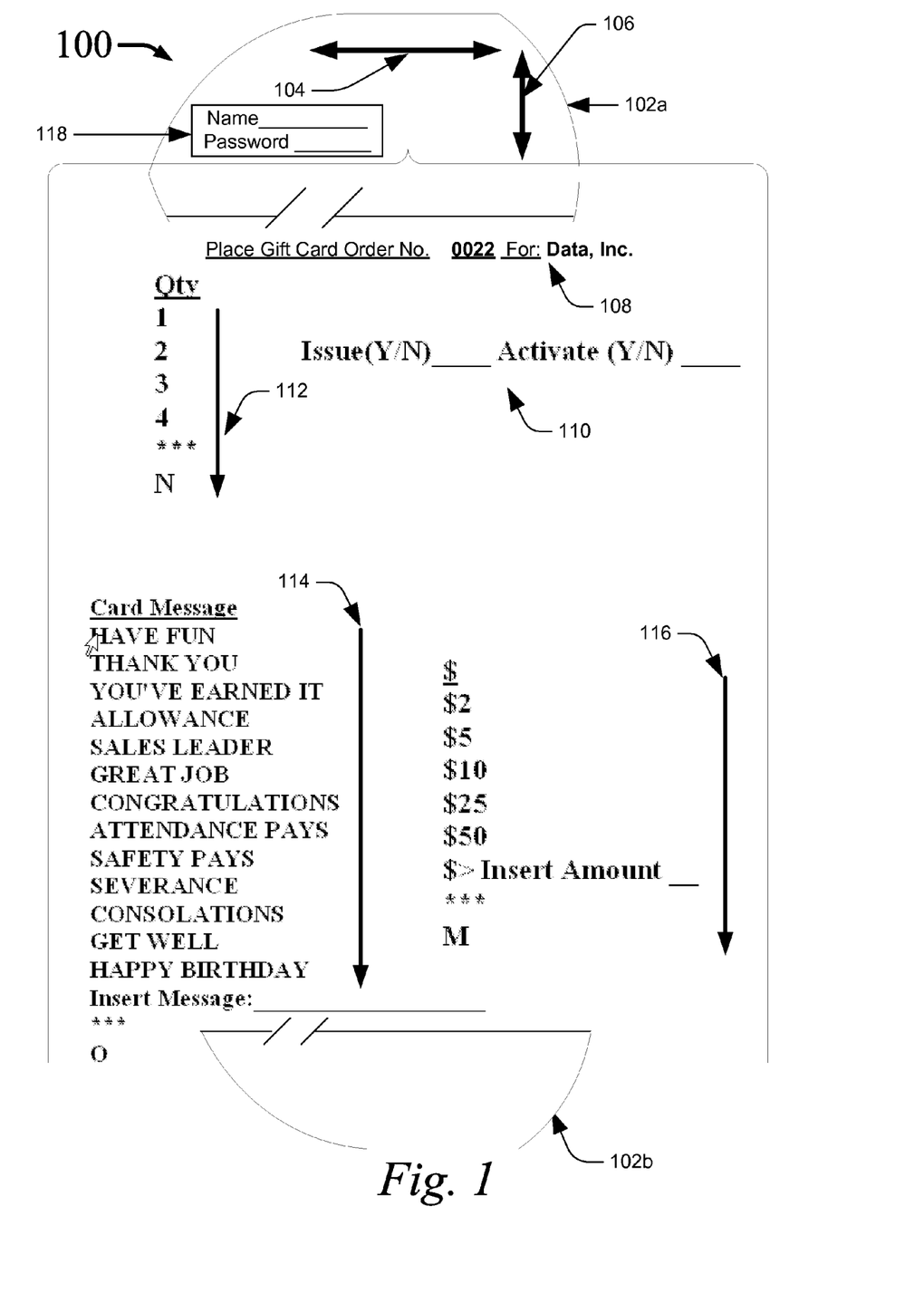
FIG. 1 illustrates an exemplary user interface to log in and enter an order for a plurality of Portable Consumer Payment Device (PCPDs)

Electronic bulk ordering and activating of multiple Portable Consumer Payment Devices (PCPDs) is discussed beginning in FIG. 1 which illustrates an exemplary user interface 100 having an exploded view of a display 102a, 102b. User interface 100 can be used by a user to input an order for one or more sets of PCPDs, where each set can be different from other sets in the order by the quantity of PCPDs in the set, the message superimposed upon each PCPD in the set, the denomination of currency for each PCPD in the set, and a card status of the PCPDs in the set as to whether the status is to be unissued, issued but inactive, or activated.

User interface 100 includes log-in information to be input by a user into fields 118, horizontal and vertical scroll functions 104, 106 operable by the user to scroll set and order information displayed on the user interface 100, a order number field 108 for a company (i.e., "Data, Inc.) for which the order is being placed, a pull down menu 112 for a quantity of PCPDs, a pull down menu 114 for a message to be superimposed upon each PCPD, a pull down menu for a denomination of the currency for each PCPD, and user input field to select whether each PCPD is to unissued, issued but inactive, or activated. Optionally, pull down menu 114 has an entry for the user to type in a card message, and pull down menu 116 has an entry for the user to enter a dollar amount for the PCPD being entered into an order.

Figure 2:
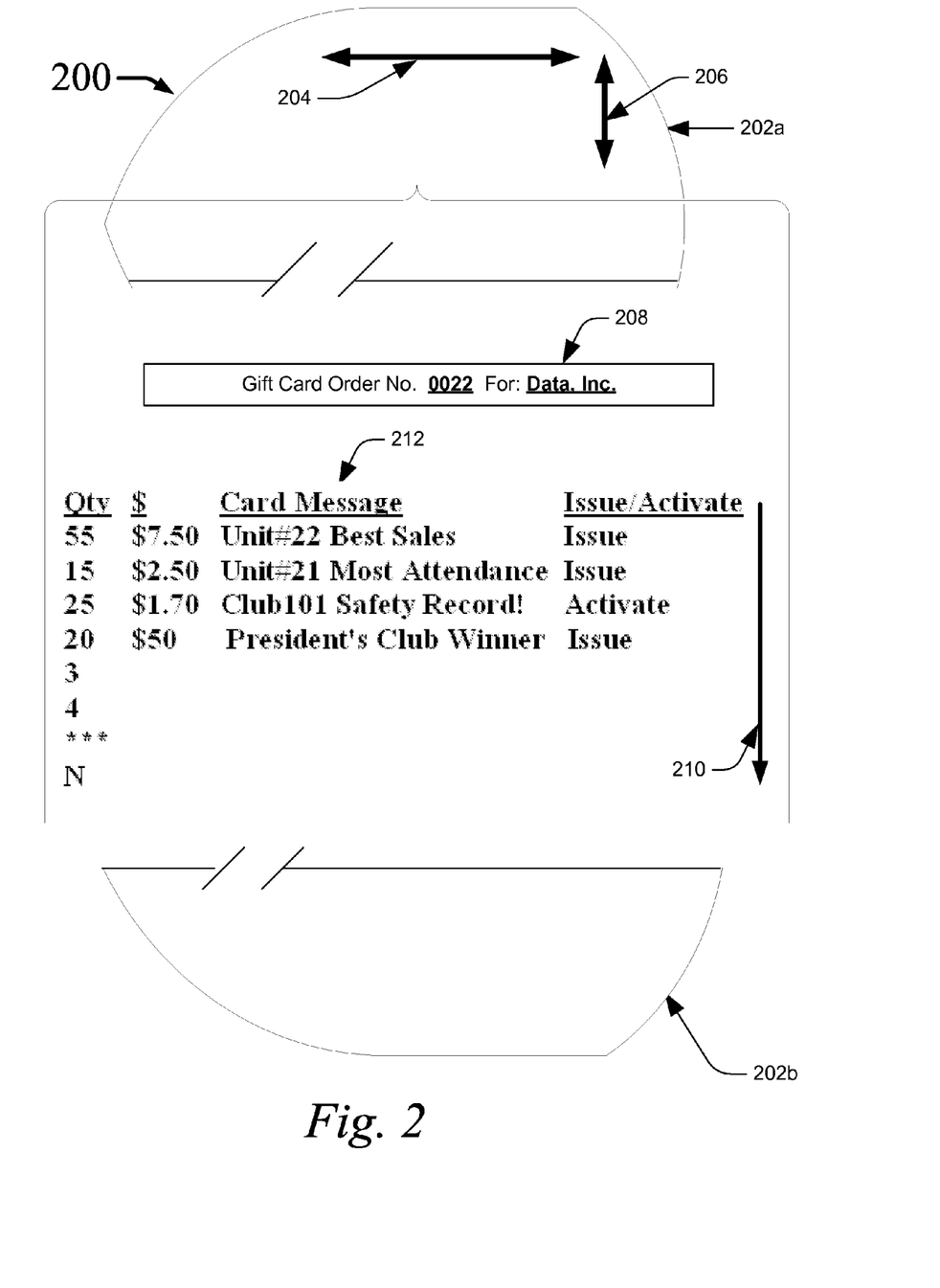
FIG. 2 illustrates an exemplary user interface displaying an order for a plurality of PCPDs.

FIG. 2 illustrates an exemplary user interface 200 having an exploded view of a display 202a, 202b. User interface 200 includes horizontal and vertical scroll functions 204, 206 operable by the user to scroll set information about an order on the user interface 200. User interface 200 also has a pull down menu 210 for a display 212 of rows, where each row is a 'set', and where sets 1 through N of PCPDs are shown in Order No. 0022 for company "Data, Inc." as seen at reference numeral 208. Menu 210 shows, for each set, the quantity of PCPDs in the set, the denomination of currency for each PCPD in the set, the message superimposed upon each PCPD in the set, and an option for the user to choose the status of the PCPDs in the set, which can be chosen to be unissued, issued but inactive, or activated.

Figure 3:
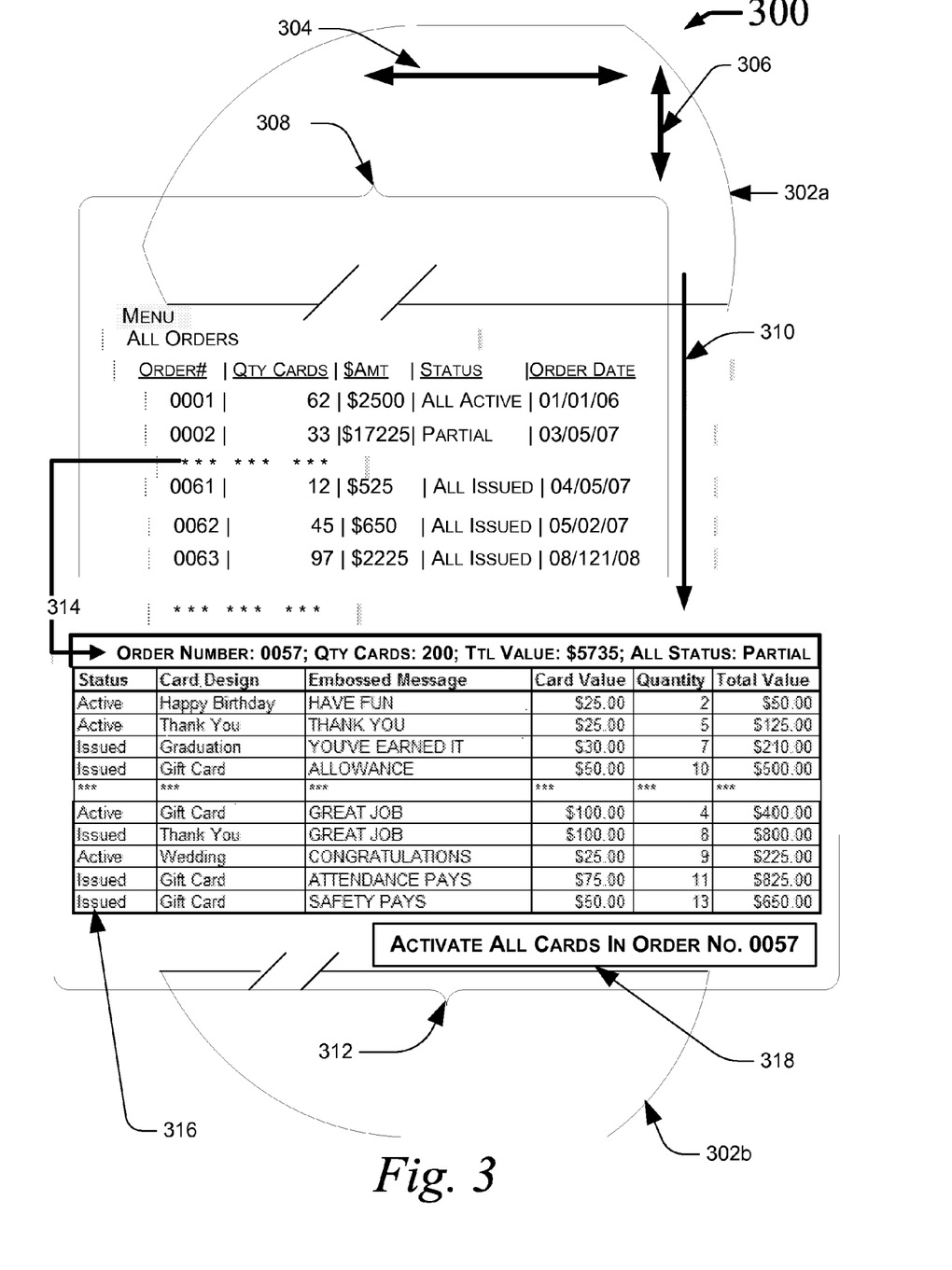
FIG. 3 illustrates an exemplary user interface displaying a plurality of orders for PCPDs, and for selecting each such order for activation of the PCPDs therein.

FIG. 3 illustrates an exemplary user interface 300 having an exploded view of a display 302a, 302b. User interface 300 includes horizontal and vertical scroll functions 304, 306 operable by the user to scroll information about several orders, and by selection, the respective sets therein, on the user interface 300. User interface 300 also has a pull down menu 310 for a display of all orders. By selection of the displayed order "0057", as shown at reference numeral 314, the sets in the selected orders will be displayed. FIG. 3 shows each set of the selected order as a row in a table 312, where the order 0057 has 200 cards, for a total value of $5735, and the card status of the PCPDs in the order is "Partial" or mixed, as shown in column 316. The first set in order 0057 show all devices as being active and displaying the message "Happy Birthday", and the "Have Fun" embossed message, where each device has a value of $25, that there are two cards in the set, and that the total value of the PCPDs in the set is $50. A user selectable button 318 allows the user to activate all devices in the selected set of the order 0057.

Figure 4:
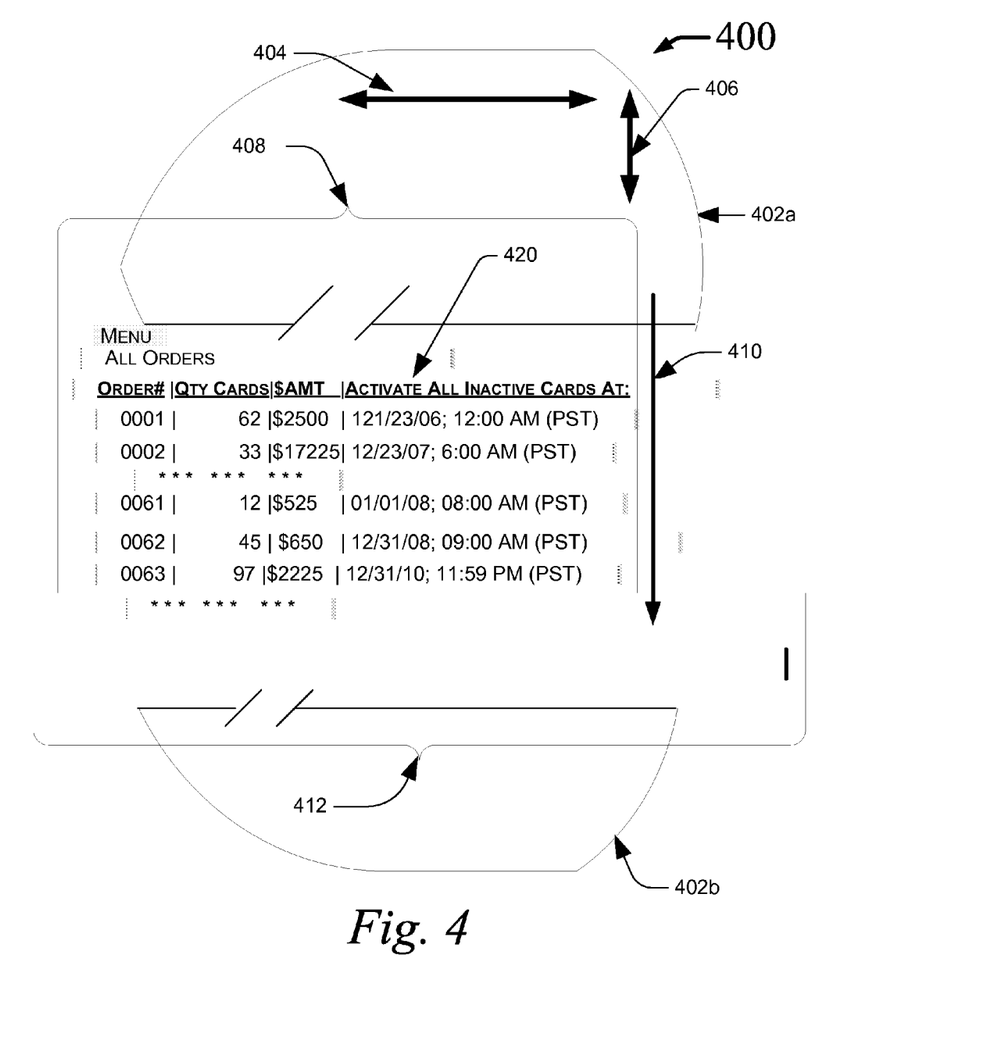
FIG. 4 illustrates an exemplary user interface displaying a plurality of orders for PCPDs, and for selecting a date upon which the PCPDs in a selected order will be activated.

FIG. 4 illustrates an exemplary user interface 400 displaying a plurality of orders for PCPDs in respective rows of a table seen at reference numerals 410, 412 as displayed via a pull down menu 410. User interface 400 is seen in an exploded view of a display 402a, 402b. User interface 400 includes horizontal and vertical scroll functions 404, 406 operable by the user to scroll information about several orders. A field is provided in each row for a user to enter or select, for that order, a predetermined date and time at which all of the PCPDs in the selected order will be simultaneously activated.

Figure 5:
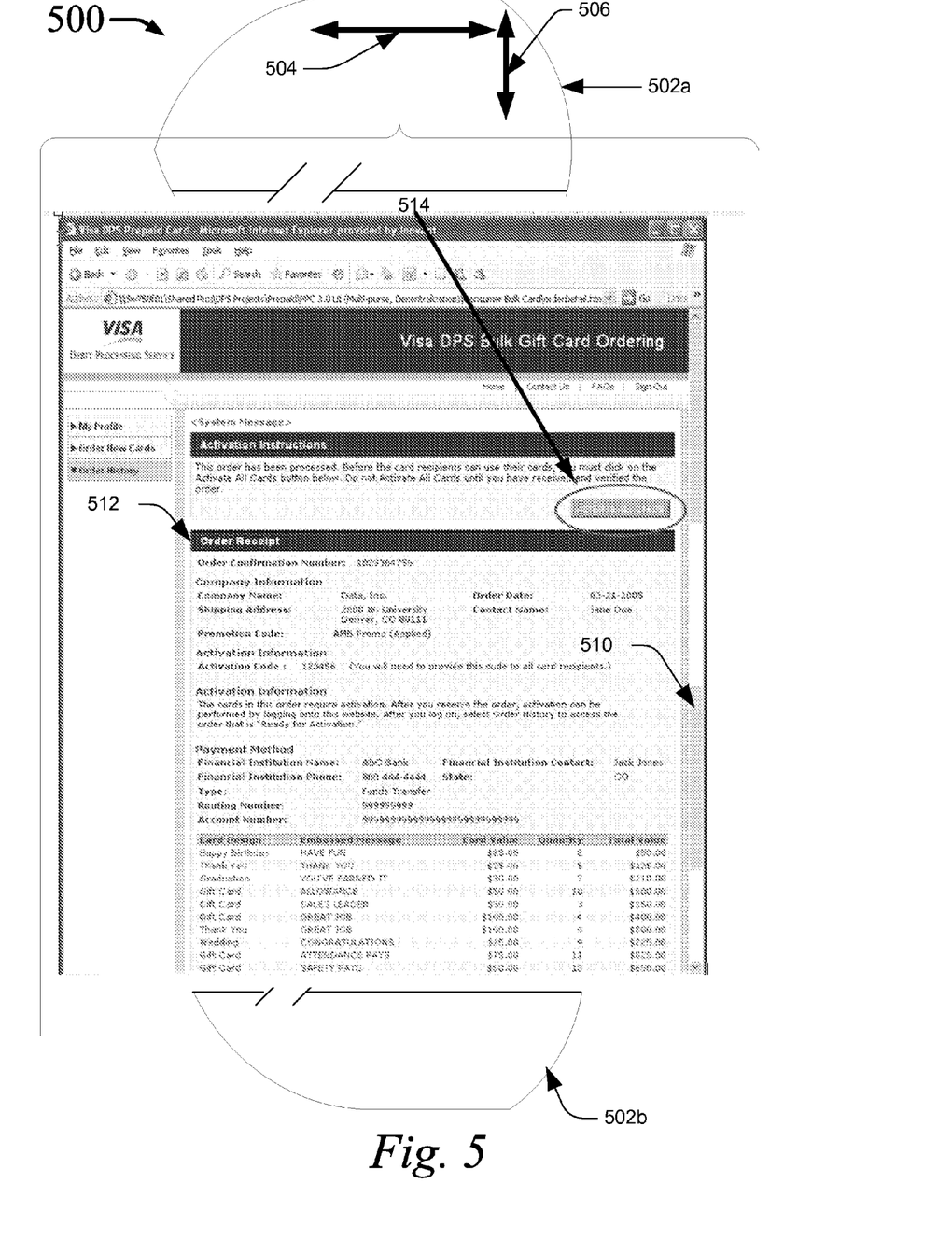
FIG. 5 illustrates an exemplary user interface displaying an order receipt for plurality of PCPDs, and for selecting that all of the PCPDs in the order will be activated.

FIG. 5 illustrates an exemplary user interface 500 having an exploded view of a display 502a, 502b. User interface 500 includes horizontal and vertical scroll functions 504, 506, as well as scroll function 510, each of which is operable by the user to scroll information about an order receipt 512. A user selectable button function 514 is provided for the user to select so that all of the PCPDs in the order will simultaneously have a card status of "activated".

Figure 6:
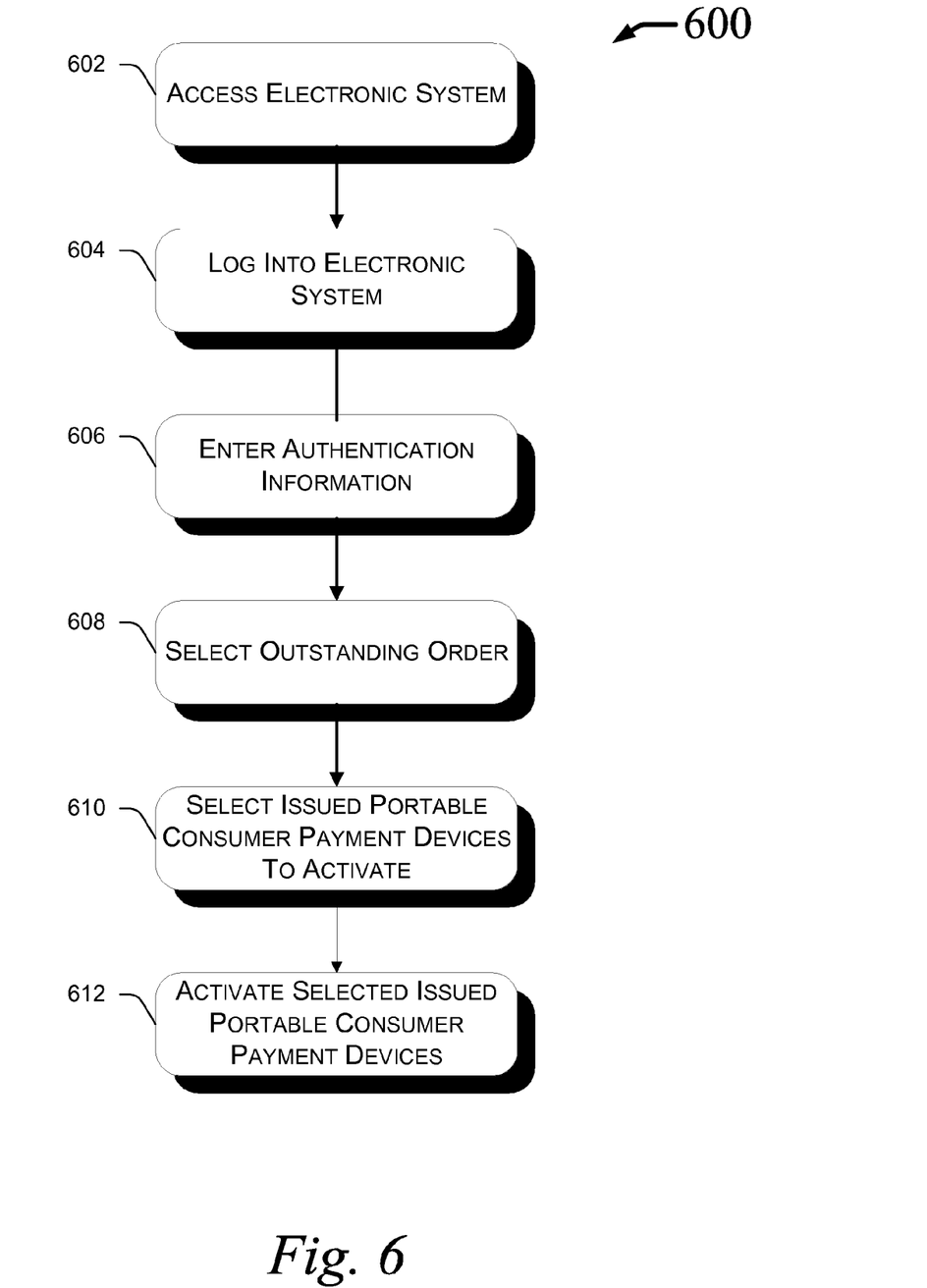
FIG. 6 depicts a flow chart of an exemplary process to bulk activate multiple PCPDs.
Figure 7:
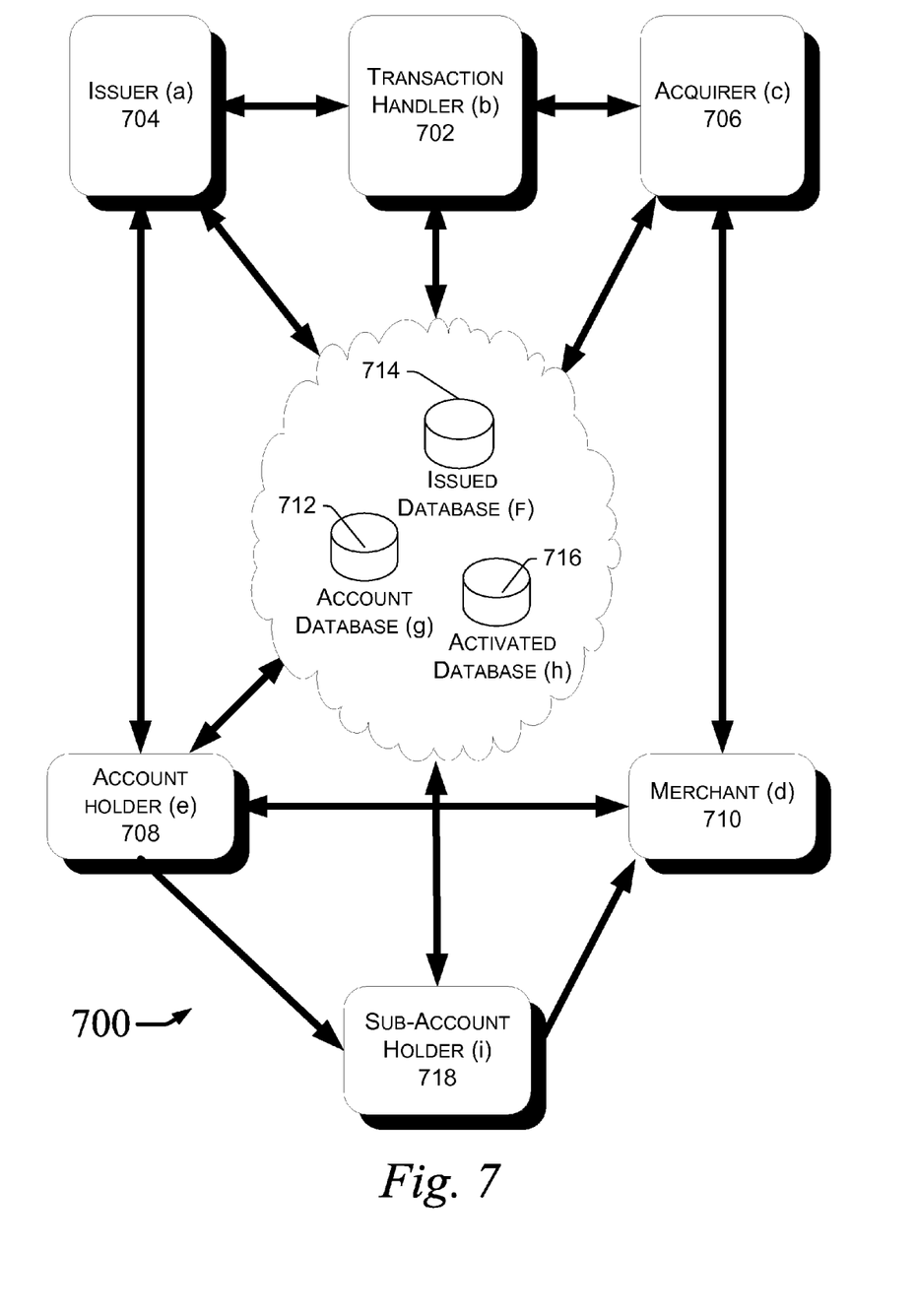
FIG. 7 illustrates an exemplary payment processing network to receive orders for PCPDs and activation thereof.

FIG. 6 depicts a flow chart of an exemplary process 600 to simultaneously bulk activate multiple PCPDs each of which is intended to be used in a payment processing system as seen in FIG. 7. A transaction handler (b) 702 in FIG. 7 processes a plurality of transactions each characterized by a merchant (d) 710 and a sub-account holder (i) 708 engaging in the transaction upon an account issued by an issuer (a) 740 and associated with a PCPD. In process 600, a purchaser (i.e., account holder (e) 708 seen in FIG. 7) has ordered multiple PCPDs from an issuer (i.e., issuer (a) 704 seen in FIG. 7). Beginning with block 602, the purchaser accesses an electronic system. This system may specifically provide information on the account that is paying for the PCPDs. In other implementations, the system may be an electronic ordering system used by the purchaser solely to order and activate the PCPDs.

To retrieve information on the electronic system, the purchaser logs onto the system. The process of logging in may include providing a user name and password (i.e., see reference numeral 118 in FIG. 1), entering an account identifier, translating distorted text, or any other method of logging onto a remote system, or combination thereof. This takes place at block 604. At block 606, the purchaser provides authentication information such as a password, a confirmation number, a purchaser order number, or any other identifying information, or combination thereof. The purchaser may then, in some implementations, be presented with an order history (i.e., reference numeral 400 seen in FIG. 4). By selecting an order at block 608, the purchaser may be presented with a listing of the PCPDs requested in that order (i.e., reference numeral 420 seen in FIG. 4). In some implementations the list may provide detailed information such as, for example, activation status, type of PCPD, PCPD design, embossed message, monetary value, etc. This information may be provided for each PCPD individually or for each group of PCPDs having common characteristics, such as those being prepaid gift cards, having the same design, embossed message, and denomination.

At block 610, the purchaser selects the PCPDs to bulk activate. In some implementations, the purchaser may select all of the PCPDs in the order to activate (i.e., reference numerals 110, 212, 318, 420 seen in FIGS. 2-4, respectively). In other implementations, the purchaser may select specific PCPDs or those PCPDs with particular characteristics to activate in a single transaction, choosing to leave the remaining PCPDs for activation individually or in another bulk transaction at a later time (i.e., see each selectable row at reference numeral 312 seen in FIG. 3). Lastly, at block 612, the purchaser of the order initiates the simultaneous activation of the selected PCPDs in a single 'click' or a 'one-click' activation function.

From the point of view of the transaction handler (b) 702 in FIG. 7, a first input is received from a client interactive user interface. The first input includes one or more orders for a plurality of PCPDs. Each order includes an account issued by the issuer (a) 740 and one or more sets of PCPDs. Each set has a quantity of PCPDs. Each PCPD in the set has an account different that the account of the order, but is still issued by the same issuer (a) 704. Each PCPD also has a predetermined message for display thereon, a denomination of a currency (i.e., $5, $10, $25, etc.) for the PCPD, and a card status that can be unissued, issued but inactive, or issued and active.

An order identifier is assigned to the order (i.e., see reference numerals 108, 208, 308, 420, 412). A second input is received from the client user interface that includes a request, for the order identifier, to change one or more card statuses for the corresponding PCPDs in the corresponding order. The request can be directed to the entire order or to just one or more sets of PCPDs in the order. In either event, the change to the card status of the PCPDs can be (i) from unissued to the status of 'issued' and without activating any device; (ii) or from 'issued' to 'active'.

As shown in FIG. 4 at reference numeral 420, a third input can be received from the interactive user interface 400 that specifies, for one order identifier, an auto-activate predetermined date and time. When so input, at the predetermined date and time, all the PCPDs in other order corresponding to the order identifier will be simultaneously activated, regardless of their prior card statuses.

When a card status is changed for a PCPD, a fee will be assessed to the account holder (e) 708, such as by issuer (a) 704 of the devices and/or by transaction handler (b) 702. The fee can be lower for a interactive, simultaneous bulk activation of all devices of an order at one time, as opposed to activation of only some of the sets in the order. When the PCPD is activated, the funds will move from one account issued by the issuer to a different account for the PCPD that is also issued by the issuer. For example, the funding of the different account may be for a sub-account holder (i) 718, where those funds come from an account holder (e) 708. In some implementation, sub-account holder (i) 718 is provided with an interactive user interface (not shown) by which they can activate their own PCPD by access to one or more databases 712-714.

Data access can be provided in an open or closed network, including via the Internet, via data storage for one or more issued databases (f) 714 to keep records of those PCPDs having the card status 'issued', via data storage at one or more activated devices databases (h) 716 to keep records of those PCPDs having the card status 'activated', and via data storage of one or more account databases (g) 712 to keep a record of the sub-account numbers of each of the PCPD that have been issued by one or more issuers (1-A) 704.

Referring again to FIG. 7, once a PCPD has a card status that is 'active' for an account issued by an issuer (a) 704, the account thereof will be funded such that the device will be accorded a value in the account thereof that can be spent by a sub-account holder (i) 718 (i.e., holder of a gift card) who presents the device to a merchant (d) 710 in order to conduct a transaction for goods and/or services. The merchant (d) 710 will submit the transaction to an acquirer (c) 706 for processing by a transaction handler (b) 702 who requests the issuer (a) 704 to obtain payment for the transaction from the account corresponding to the presented PCPD by the sub-account holder (i) 718. The issuer (a) 704 forwards the payment to the transaction handler (b) 702 who forwards the payment to the acquirer (c) 706 to pay the merchant (d) 710 for the goods and/or services of the transaction.

FIG. 7 illustrates an environment in which many transaction handlers (1-B) 702 can be work with different issuers (1-A) 704 (i.e., Wells Fargo, Bank of America, Washington Mutual, etc.) who issue respective accounts to account holders (1-E) 708, and can also work with many different acquirers (1-C) 706 (i.e., Wells Fargo, Bank of America, Washington Mutual, etc.) who process transactions for their respective merchants (1-D) 710 (i.e., Walmart, Target, KMart, Sears, The Gap, Nordstrom, etc.), where each transaction is with a PCPD (i.e., credit card, debit card, prepaid card, gift card, etc.) having a sub-account held by a sub-account holder (i) 718 (i.e., a recipient of a gift card associated with the corresponding sub-account), and where many different sub-account holders (1-I) 718 each may have been given the PCPD from any of many different account holders (1-E) 708 (an employer, a social club, a charity, a family member, etc.). Also seen in FIG. 7 is that many different transaction handlers (1-B) 702 (i.e., VISA, MasterCard, American Express, Diner's Club, Discover Card, etc.) can facilitate authentication, clearing and settlement among and between the issuers (a) 704 and acquirers (c) 706, respectively, for their account holders (e) 708 and the merchants (d) 710, and that receive orders for PCPDs can be interactively and simultaneously bulk activated in the illustrated environment for exemplary payment processing system 700.

In general, a transaction includes participation from different entities that are a component of a payment processing system 700, including an account holder 708 (e.g.; the consumer associated with the account), a transaction handler 702, such as a credit card company, an acquirer 706, a merchant 710, and an issuer 704. Acquirer 706 and issuer 704 can communicate through transaction handler 702. Merchant 710 may be a person or entity that sells goods or services. Merchant 710 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder 708 may be a second merchant making a purchase from another merchant 710. Merchant 710 may utilize at least one point-of-sale terminal (POS) that can communicate with acquirer 706, transaction handler 702, or issuer 704. Thus, the POS terminal is in operative communication with the payment processing system 700.

Typically, a transaction begins with account holder 708 presenting a PCPD to merchant 710 to initiate an exchange for a good or service. The PCPD may be associated with account information stored in an account databases (g) 712, accessible by issuer 704, transaction handler 702, and/or acquirer 706. The PCPD may include a payment card, a gift card, a smartcard, a smart media, a payroll card, a health care card, a wrist band, a machine readable medium containing account information, a keychain device such as a SPEEDPASS® device commercially available from ExxonMobil Corporation or a supermarket discount card, a cellular phone, personal digital assistant, a pager, a security card, an access card, a wireless terminal, or a transponder. The PCPD may include a volatile or non-volatile memory to store information such as the account number or an account holder's name.

Merchant 710 may use the POS terminal to obtain account information, such as an account number, from the PCPD. The PCPD may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer 704 of the PCPD. Alternatively, or in combination, the PCPD may communicate with issuer 704, transaction handler 702, or acquirer 706.

Issuer 704 may authorize the transaction using transaction handler 702. Transaction handler 702 may also clear the transaction. Authorization includes issuer 704, or transaction handler 702 on behalf of issuer 704, authorizing the transaction in connection with issuer 704's instructions such as through the use of business rules. The business rules could include instructions or guidelines from transaction handler 702, account holder 708, merchant 710, acquirer 706, issuer 704, a financial institution, or combinations thereof. Transaction handler 702 may maintain a log or history of authorized transactions. Once approved, merchant 710 will record the authorization, allowing account holder 708 to receive the good or service.

Merchant 710 may, at discrete periods, such as the end of the day, submit a list of authorized transactions to acquirer 706 or other components of the payment processing system 700. Transaction handler 702 may compare the submitted authorized transaction list with its own log of authorized transactions. If a match is found, transaction handler 702 may route authorization transaction amount requests from the corresponding acquirer 706 to the corresponding issuer 704 involved in each transaction. Once acquirer 706 receives the payment of the authorized transaction amount from issuer 704, it can forward the payment to merchant 710 less any transaction costs, such as fees. If the transaction involves a debit or pre-paid card, acquirer 706 may choose not to wait for the initial payment prior to paying merchant 710.

There may be intermittent steps in the foregoing process, some of which may occur simultaneously. For example, acquirer 706 can initiate the clearing and settling process, which can result in payment to acquirer 706 for the amount of the transaction. Acquirer 706 may request from transaction handler 702 that the transaction be cleared and settled. Clearing includes the exchange of financial information between the issuer 704 and the acquirer 706 and settlement includes the exchange of funds. Transaction handler 702 can provide services in connection with settlement of the transaction. The settlement of a transaction includes depositing an amount of the transaction settlement from a settlement house, such as a settlement bank, which transaction handler 702 typically chooses, into a clearinghouse, such as a clearing bank, that acquirer 706 typically chooses. Issuer 704 deposits the same from a clearinghouse, such as a clearing bank, which issuer 704 typically chooses, into the settlement house. Thus, a typical transaction involves various entities to request, authorize, and fulfill processing the transaction.

Account holder 708 may have a need to request multiple PCPDs from issuer 704, each PCPD being associated with account holder 708's account, for distribution to sub-account holders 708(*n*) to 708(N). The requested PCPDs may be, for example, corporate credit cards, prepaid gift cards, or other forms of PCPDs.

To make the request, account holder 708 may communicate directly with issuer 704 or may access a network having information on account holder 708's account stored in an account databases (g) 712. Account holder 708 can request each PCPD individually, or may place a bulk order. If the order was placed in bulk, issuer 704 then issues the number of requested PCPDs to account holder 708, each PCPD being associated with account holder 708's account. Information regarding the issued PCPDs may, in some implementations, be stored in an issued databases (f) 714, containing information on all PCPDs issued by issuer 704.

Account holder 708 may distribute each PCPD issued to a sub-account holder 708(*n*) along with an activation code, allowing each sub-account holder 708(*n*) to activate the PCPD in their possession. Alternatively, account holder 708 may access a network capable of communicating with account databases (g) 712 containing information regarding account holder 708's account. By way of example, and not by way of limitation, account databases (g) 712 is in communication with issued databases (f) 714, containing information on all issued PCPDs. In yet other implementations, account databases (g) 712 is also in communication with an activated devices databases (h) 716, storing information on all activated PCPDs.

When account holder 708 requests information regarding all cards issued to account holder 708's account, account databases (g) 712 may access issued databases (f) 714 and activated devices databases (h) 716 to report on the PCPDs that have been issued to account holder 708's account and their activation status. Account holder 708 may then be presented with an option to activate issued, but inactive, PCPDs in a single transaction. Alternatively, account holder 708 may select specific PCPDs associated with the account for activation in a single transaction, later activating the remaining PCPDs either individually or in bulk.

In other implementations, a user experience for bulk activation of PCPDs, such as gift cards, may be provided to a purchase of such devices with varieties of functionality for 'one click' simultaneous activation. For example, the purchaser may be able to select the view desired such as, for example, all orders that have been placed, all PCPDs that have issued, that are activated, or that are unissued. Additionally, the purchaser may be able to view all PCPDs associated with a given order. In additional implementations, the interactive user interface may contain additional menus allowing the purchaser to take other actions, such as, for example, activating all inactive PCPDs, cancelling all inactive PCPDs, receiving account information, or any other action associated with ordering and activating PCPDs, or combinations thereof.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

The present invention can be implemented in the form of control logic, in a modular or integrated manner, in software or hardware or a combination of both. Thus, the steps of a method, process, or algorithm described in connection with the implementations disclosed herein may be embodied directly in hardware, in a software module executed by a processor, or in a combination of the two. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The software components or functions described in this application, may be implemented as software code to be executed by one or more processors using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may also reside on or within a single computational apparatus, and may be present on or within different computational apparatuses within a system or network.

Any recitation of "a", "an" or "the" is intended to mean "one or more" unless specifically indicated to the contrary.

The present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

What is claimed is:

1. An order entry apparatus comprising:
a memory;
a processor disposed in communication with said memory, and configured to issue a plurality of processing instructions stored in the memory, wherein the processor issues instructions to:
   receive from an account holder an order identifier identifying an order for a plurality of Portable Consumer Payment Devices ("PCPDs") issuable to a plurality of PCPD holders;
   the order being associated with the account holder's account issued by an issuer; and
   the plurality of PCPDs each having:
      a user selected message for display on each PCPD;
      a denomination of a currency; and
      a card status of inactive;
   receive from the account holder an auto-activate request to simultaneously change the card status of a selected plurality of the PCPDs in the order to the card status of active at a predetermined date and time subsequent to placement of the order; and
   in response to the received auto-activate request from the account holder:
      execute an instantiating activation of each selected PCPD issuable to a PCPD holder at the predetermined date and time; and transfer funds corresponding to the denomination of a currency from said account associated with the order to a sub-account associated with each auto-activated PCPD.

2. The order entry apparatus as defined in claim 1, further comprising instructions to:
assess an activation fee to said account associated with the account holder for the activation of the PCPDs in the order.

3. The order entry apparatus as defined in claim 2, wherein the fee corresponds to:
the request; and
the number of PCPDs in the order for which the card status was changed to the card status of active.

4. The order entry apparatus as defined in claim 1, wherein upon the activation of each said PCPD in the order but not prior thereto:
said auto-activated PCPD is usable by the auto-activated PCPD holder thereof to conduct a transaction for up to the denomination of the currency in said sub-account with a merchant who submits the transaction to an acquirer for processing by a transaction handler who requests the issuer to obtain payment for the transaction from said sub-account; and
the issuer forwards the payment to the transaction handler who forwards the payment to the acquirer to pay the merchant for the transaction.

5. A computer implemented method comprising:
receiving from an account holder, in a computer configured to activate a plurality of Portable Consumer Payment Devices ("PCPDs"), a request, an auto-activate predetermined date that is other than a date of purchase, and an order identifier identifying an order for the plurality of PCPDs issuable to a plurality of PCPD holders;
the order associated with the account holder's account issued by an issuer; and
the plurality of PCPDs each having:
a user selected message for display on the PCPD;
a denomination of a currency; and
a card status of inactive;
receiving from the account holder an auto-activate request to simultaneously change each said card status of a selected plurality of the PCPDs in the order to the card status of active at the auto-activate predetermined date that is other than a date of purchase; and
in response to the auto-activate request received from the account holder,
executing an instantiating activation of each selected PCPD at the predetermined date and time;
transferring funds corresponding to the denomination of a currency from said account associated with the order to a sub-account associated with each auto-activated PCPD;
assessing, using the computer, an activation fee to said account associated with the order for the activation of each selected PCPD in the order.

6. The computer implemented method as defined in claim 5, wherein the assessed fee corresponds to the number of PCPDs in the order for which the card status was changed to the card status of active.

7. The method of claim 5, wherein the inactive status includes one of: (i) not issued, or (ii) issued but not activated.

8. The method of claim 5, wherein the auto-activate request to simultaneously change the card status of the selected plurality of the PCPDs in the order is initiated by a single action from the account holder.

9. The method of claim 5, wherein at least one of the plurality of the PCPDs in the order is configured for activation by a PCPD holder thereof.

10. The method of claim 5, wherein the activation fee assessed to said account associated with the order is the lowest when the selected plurality of the PCPDs includes all of the PCPDs in the order.

11. The method of claim 5, further comprising:
receiving from the account holder a request for information regarding PCPDs corresponding to a plurality of orders issued to the account holder's account;
providing in response to the received request for information, PCPDs that are issued to the account holder's account and activation status thereof; and
providing the account holder an option to activate one or more PCPDs that are issued to the account holder's account and have an inactive status.

12. The method of claim 11, further comprising:
obtaining an indication from the account holder to activate the PCPDs that are issued to the account holder's account and have an inactive status, wherein said indication is provided via a single action.

13. The method of claim 5, wherein the selected plurality of the PCPDs in the order correspond to PCPDs that are selected by the account holder.

14. The method of claim 5, wherein the selected plurality of the PCPDs in the order correspond to PCPDs that are selected based on PCPD characteristics.

15. A processor-readable medium having processor-executable program instructions residing thereon, wherein the processor-executable program instructions are issuable by the processor to:
receive from an account holder an order identifier identifying an order for a plurality of Portable Consumer Payment Devices ("PCPDs") issuable to a plurality of PCPD holders;
the order being associated with the account holder's account issued by an issuer;
the plurality of PCPDs each having:
a user selected message for display on each PCPD;
a denomination of a currency; and
a card status of inactive;
receive from the account holder an auto-activate request to simultaneously change the card status of a selected plurality of the PCPDs in the order to the card status of active at a predetermined date and time subsequent to placement of the order; and
in response to the received auto-activate request from the user:
execute an instantiating activation of each selected PCPD at the predetermined date and time; and
transfer funds corresponding to the denomination of a currency from said account associated with the order to a sub-account associated with each auto-activated PCPD.

16. The processor-readable medium as defined in claim 15, further comprising program instructions issuable by the processor to:
assess an activation fee to said account associated with the order for the activation of the PCPDs in the order, wherein the activation fee corresponds to:
the request; and
the number of PCPDs in the order for which the card status was changed to the card status of active.

17. The processor-readable medium as defined in claim 15, wherein upon the activation of each said PCPD in the order but not prior thereto:

said PCPD is usable by the PCPD holder thereof to conduct a transaction for up to the denomination of the currency in said sub-account with a merchant who submits the transaction to an acquirer for processing by a transaction handler who requests the issuer to obtain payment for the transaction from said sub-account; and the issuer forwards the payment to the transaction handler who forwards the payment to the acquirer to pay the merchant for the transaction.

\* \* \* \* \*